Oct. 21, 1924.
R. H. WHITE
TRACKLAYING TRACTOR
Filed Dec. 9, 1920
1,512,152
3 Sheets-Sheet 2
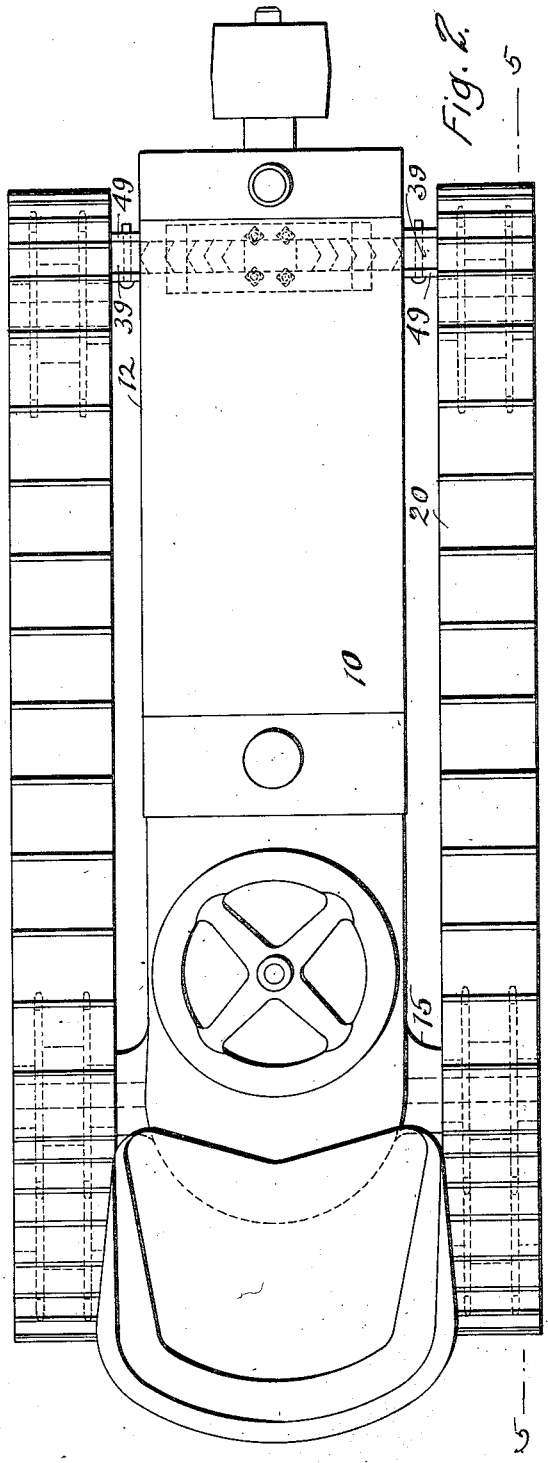
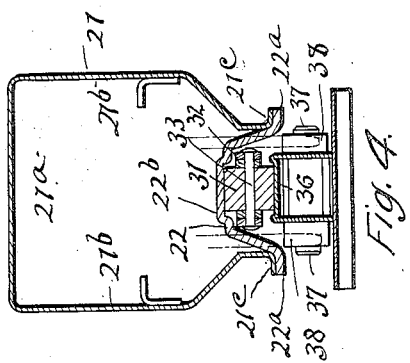
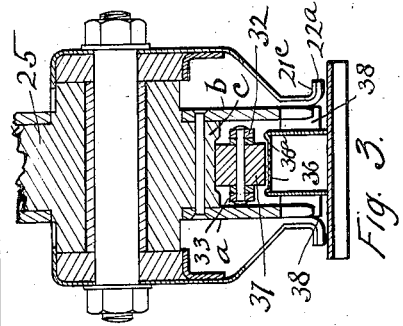
Inventor
Rollin H. White.
By Thurston Kwis & Hudson
Attorneys.

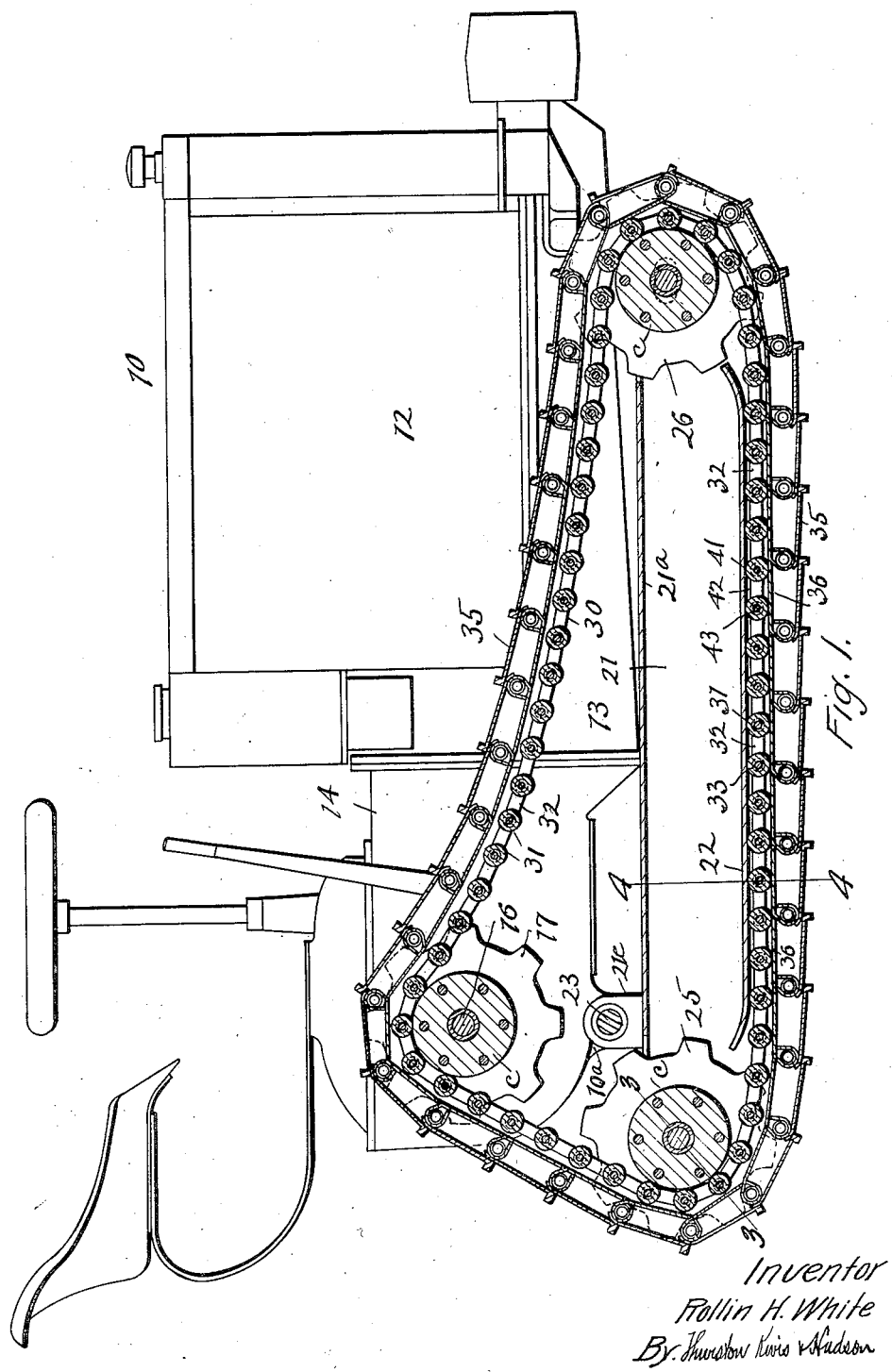

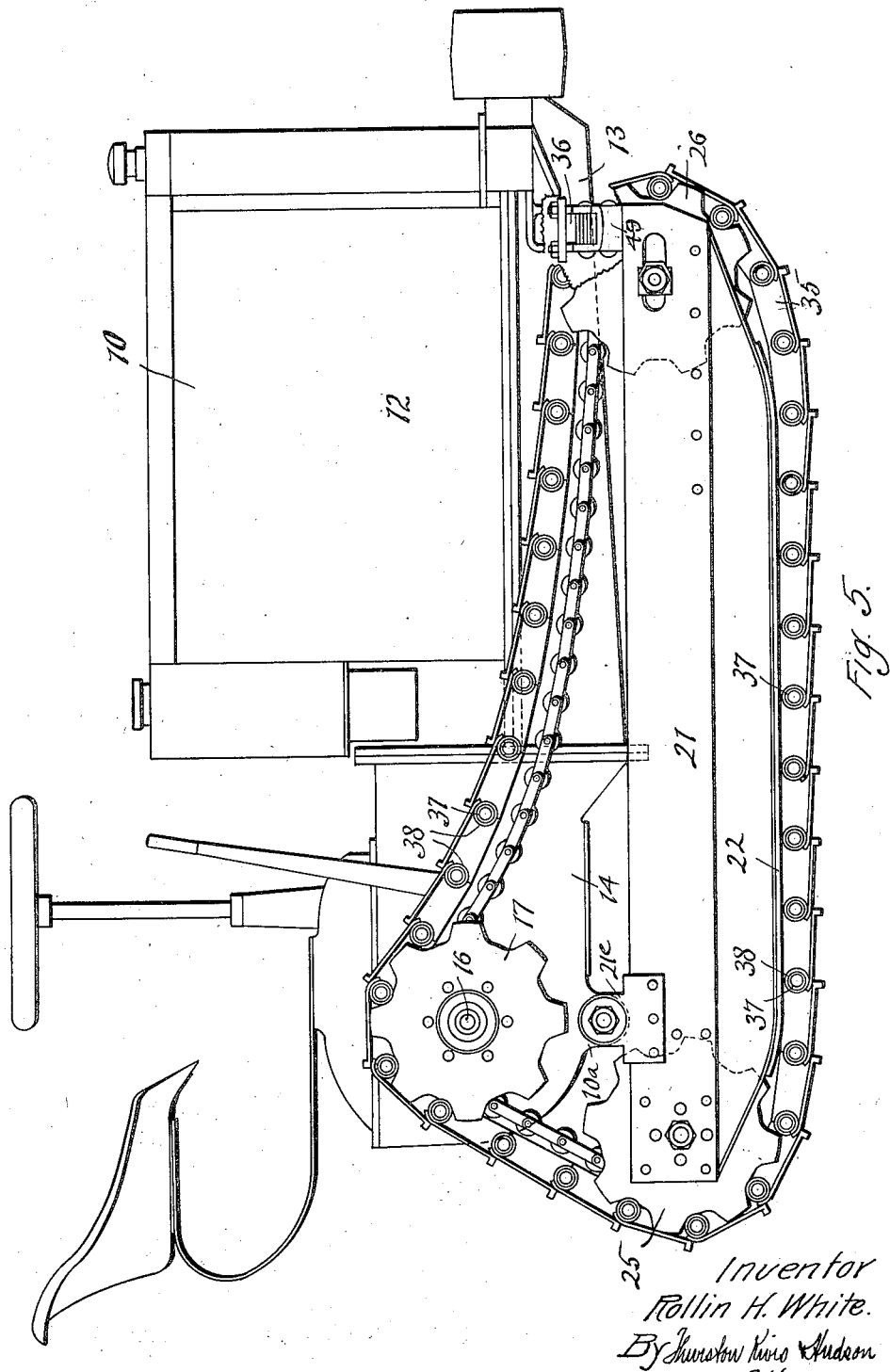

Patented Oct. 21, 1924.

1,512,152

UNITED STATES PATENT OFFICE.

ROLLIN H. WHITE, OF CLEVELAND HEIGHTS, OHIO, ASSIGNOR TO THE CLEVELAND TRACTOR COMPANY, OF EUCLID, OHIO, A CORPORATION OF OHIO.

TRACKLAYING TRACTOR.

Application filed December 9, 1920. Serial No. 429,416.

*To all whom it may concern:*

Be it known that I, ROLLIN H. WHITE, a citizen of the United States, residing at Cleveland Heights, in the county of Cuyahoga and State of Ohio, have invented a certain new and useful Improvement in Tracklaying Tractors, of which the following is a full, clear, and exact description.

This invention relates to track laying tractors, the object being to produce cheaply an efficient and durable tractor of this class.

The invention consists in the construction and combination of parts shown in the drawings, hereinafter described and pointed out definitely in the appended claims.

In the drawings, Fig. 1 is a side elevation of a track laying tractor which embodies the invention; Fig. 2 is a plan view of the same; Fig. 3 is a vertical transverse section in the plane of line 3—3 on Fig. 1 through one of the runners; Fig. 4 is a vertical transverse section in the plane of line 4—4 on Fig. 1 through one of the runners; Fig. 5 is a sectional side elevation in the plane of line 5—5 on Fig. 2.

The tractor shown in the drawing includes a main frame represented generally by 10, and two endless track structures represented generally by 20, which are located respectively on opposite sides of the main frame and which serve as the ground engaging instrumentalities upon which the main frame is suspended.

In the particular construction shown this main frame is made up of three rigidly connected castings, namely, a front member 12 which includes the engine and the upper half of the crank case, a member 13 which serves as the lower half of the crank case, and a rear member 14 which houses and supports the transmission mechanism. This specific construction is not essential to the present invention.

The rear member of the main frame is formed with two aligned laterally projecting tubular lugs 15 which in part support two shafts 16 which are of course to be driven through suitable mechanism enclosed in the transmission case, each of these shafts carrying on its outer end a driving sprocket 17.

Each of the endless track structures 20 includes a runner 21. This runner has for its main member a pressed metal piece 21 which is bent so as to have the top member 21$^a$ and the two side members 21$^b$. A shoe 22 is secured to the member 21, and forms the bottom member of the runner. This shoe is also made preferably out of pressed metal. Its edges are turned outward as flanges 22$^a$, and these engage with and are secured, preferably by welding, to outwardly bent flanges 21$^c$ on the lower edges of the members 21. This shoe is formed with a groove 22$^b$ which extends longitudinally from end to end, the width of said groove being slightly greater than the width of the rollers 31 to be hereinafter referred to.

Near its rear end each of these runners is pivoted to the main frame, the pivots 23 of the two runners being aligned. To effect this pivotal connection each runner is provided with two upwardly extended bracket plates 21$^e$, and the main frame is formed with two downwardly extended lugs 10$^a$. Each of these lugs is located below the axis of the shaft 16 and each goes between a pair of the bracket plates 21 and is pivoted to them.

Associated with each of the runners, and forming a part of the endless track structure of which also the associated runner is a part, is a track belt 35 made up of a plurality of pivoted together links. In a general way these links may have any suitable construction, but it is essential that each link shall be provided with an elevated track plate 36 for the rollers 31 to engage with; and it is desirable that these track plates be formed with longitudinal grooves 36$^a$. This track belt is provided at the joints between links with two cylindrical projections 37, located on opposite sides thereof for engagement with the two wheels of the sprockets around which the track belt goes. A track belt which is particularly adapted for use in connection with the other parts of the tractor shown is such a track belt as forms the subject matter of my application Serial No. 396,955, filed July 13, 1920; and it is this track belt which is shown in the drawing. Preferably rollers 38 are rotatably mounted on the projections 37 to thereby reduce the friction and wear incident to the engagement of the track belt with the sprockets over which it runs.

In the machine there are three sprockets associated with each track belt. One of these is the driving sprocket 17 secured as stated to the driven shaft 16. Another sprocket 25 is rotatably mounted at the rear end of the runner behind the pivot 23, and another sprocket 26 is rotatably mounted on the runner near the front end thereof. Both of the sprockets 25 and 26 lie for the most part between the side members of the runner, but they project beyond the ends of the runner, and they also project up through slots in the top member of the runner. Each of the three sprockets is formed with two sprocket wheels *a* and *b*, and with a cylindrical hub *c* located between them, the diameter of said hub being considerably smaller than the diameter of the sprockets.

The rollers 31 to which reference has been made are carried by a roller chain 30, which roller chain embraces the cylindrical parts *c* of the three sprockets and consequently lies inside of the track belt which runs over the sprockets; and this roller chain also passes between the shoe of the runner and the ground reach of the track belt, and serves as the means through which the weight of the machine is transferred to the ground reach of said track belt.

It is to be noted that the links 32 of the roller chain are only about half as long as the links of the track belt. Therefore each track belt unit will always be engaged by two rollers, and thereby the bending of the ground reach of the track belt will be prevented. These links are pivoted together by pins 33 and the rollers 31 are loosely mounted to rotate upon these pins.

As the track belts 35 are driven by the driven sprockets 17 and are therefore caused to travel around the three sprockets and backward beneath the shoe of the runner, the forward movement of the tractor will be produced. The runners which support the main frame will run along on the rollers 41 with which they will have rolling contact, and these rollers will roll along upon the ground reach of the two track belts, engaging the longitudinally grooved track plates 36 of the component links.

The lateral movement of the track belt will be prevented by reason of the fact that the rollers 31 engage in the longitudinal grooves in the track plates 36 of the track belt links, and also in the longitudinal groove 22$^b$ of the runner.

The hubs *c* in the sprockets 17, 25 and 26 are of smaller diameter than the sprocket wheels *a* and *b*, permitting the roller chain to travel around the hubs *c* between the sprocket wheels *a* and *b*, inside of the endless tracks. The driving sprocket 17 in this manner supports the endless roller chains from the main frame in a plane above the runners, and the sprocket wheels *a* and *b* will guide the roller chains, serving to maintain them in longitudinal alignment with the sprockets 25 and 26. The roller chain is thus prevented from riding and becoming entangled with the teeth of the idler sprocket wheels *a* and *b* while traveling forward or backward relative thereto. The hubs *c* in the sprocket 17 rotate as the roller chain travels, thereby reducing friction and wear upon both the chains and hubs.

The front end of the main frame may be supported from the front ends of the two runners by any suitable suspension device. The device shown includes a transversely extended leaf spring 39 which is clipped to the main frame and at its ends engages with brackets 49 secured to the runners.

Having described my invention, I claim:

1. In a track laying tractor, the combination of a main frame, and an endless track structure on opposite sides thereof, each endless track structure including a runner which is operatively connected to the main frame, a double sprocket mounted on the runner near each end thereof, a double driving sprocket mounted on the main frame in a plane above the sprockets on the runner, each of the three sprockets having two sprocket wheels and a hub of smaller diameter between them, a jointed endless track belt which embraces the three sprockets and passes beneath the runner, said track belt being provided with a plurality of laterally extended lugs which engage the sprocket wheels of the double sprockets, and a roller chain which embraces the hubs of the three sprockets and passes beneath the runner in engagement with it and the ground reach of the track belt, the runner being formed with a longitudinally grooved bottom shoe and each track belt link being provided with a longitudinally grooved track plate, and the rollers of the roller chain being of such length that as they pass beneath the runner they engage the longitudinal groove in the shoe and the longitudinal grooves in said track plates.

2. In a track laying tractor, the combination of a main frame, and an endless track structure including a runner which is pivoted near its rear end to the main frame and has a load supporting connection near its front end with the main frame, sprockets rotatably mounted on said runner near the front and rear ends thereof, a driving sprocket mounted on the main frame in a plane above the sprockets on the runner, said sprockets each having a pair of sprocket wheels having a hub of smaller diameter secured therebetween, and endless track belt which embraces and engages the sprocket wheels of said sprockets and passes beneath the runner, and a roller chain which embraces the hubs of said sprockets intermediate said sprocket wheels, said roller chain extending interiorly of said track belt and passing beneath the runner in engagement with it and the ground reach of said track belt, said sprocket wheels, hubs, and track belt being related to maintain said roller chain in longitudinal alignment with said runner.

3. In a track laying tractor, the combination of a main frame, and an endless track structure on opposite sides thereof, each endless track structure including a runner having a longitudinally grooved bottom shoe, a driving sprocket carried by said main frame in a plane above said runner, said sprocket including a pair of spaced sprocket wheels having a hub of smaller diameter secured therebetween, an endless track belt which embraces said runner and sprocket wheels, and an endless roller chain which extends around the hub of said sprocket interiorly of said track belt and passes beneath the runner in engagement with the grooved bottom shoe and the ground reach of said track belt, the relation of said sprocket wheels, hub and track belt maintaining said roller chain in longitudinal alignment with the groove in said runner shoe.

In testimony whereof, I hereunto affix my signature.

ROLLIN H. WHITE.